May 7, 1957 A. H. JORDAN 2,791,481
CONTROLLER
Filed June 9, 1954 4 Sheets-Sheet 1

INVENTOR.
ARTHUR H. JORDAN
BY Arthur H. Swanson
ATTORNEY.

May 7, 1957

A. H. JORDAN 2,791,481

CONTROLLER

Filed June 9, 1954

*INVENTOR.*
ARTHUR H. JORDAN

BY *Arthur H. Swanson*

ATTORNEY.

INVENTOR.
ARTHUR H. JORDAN
BY Arthur H. Swanson
ATTORNEY.

United States Patent Office 2,791,481
Patented May 7, 1957

2,791,481

CONTROLLER

Arthur H. Jordan, Bala Cynwyd, Pa., assignor to Minneapolis-Honeywell Regulator Company, Minneapolis, Minn., a corporation of Delaware Application June 9, 1954, Serial No. 435,437

8 Claims. (Cl. 346—45)

This invention is directed in general to features of a self-balancing potentiometer of the strip chart type. It is specifically directed to the print wheel carriage and the mechanism by means of which the print wheel and the ink wheel are rotated, the chart is driven, and the thermocouples are selected.

In most multiple recording instruments there is provided a print wheel carriage on which wheel is formed a plurality of printing characters. Each of these characters must be moved to a recording position corresponding to the value of the condition under measurement when a particular primary element, for example, a thermocouple, is connected to the instrument. Thereafter, the print wheel is moved to bring the character then in recording position into engagement with a chart to make a record. There is also provided an ink wheel having one or more ink pads that are brought into engagement with the printing characters prior to the time each record is made. If all the records are to be in the same color, a single ink pad may be used. It is more usual, however, to have each record made in a different color so that a different ink pad must be provided for each printing character. This means that the movement of the ink wheel must be synchronized with the movement of the print wheel so that the same printing character will always engage the same color ink pad.

It is an object of the present invention to provide an instrument which is adapted to make in sequence the record of the values of a plurality of variables.

It is a further and more specific object of the invention to provide a print wheel carriage that is so constructed that the print wheel and ink wheel may be synchronously rotated in such a manner that they will not get out of step.

It is a further object of the invention to provide a novel and accurate construction of a print wheel carriage by means of which the print wheel and ink wheel may be rotated as the print wheel is moved away from and toward the chart. In this fashion immediately after a record has been made the print wheel is rotated to bring a new printing character into recording position in readiness for the next record to be made.

It is a further object of the invention to provide a novel arrangement for positively and accurately rotating the ink wheel and print wheel on a print carriage of a multiple recording instrument which arrangement is entirely mounted on the carriage.

It is a further object of the invention to provide a novel means for holding the ink wheel in position on a print wheel carriage. This means is so arranged that the ink wheel can be mounted in only one position, and is further characterized by the fact that the ink wheel may be moved into place on the print wheel carriage without engaging the printing characters of the print wheel.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
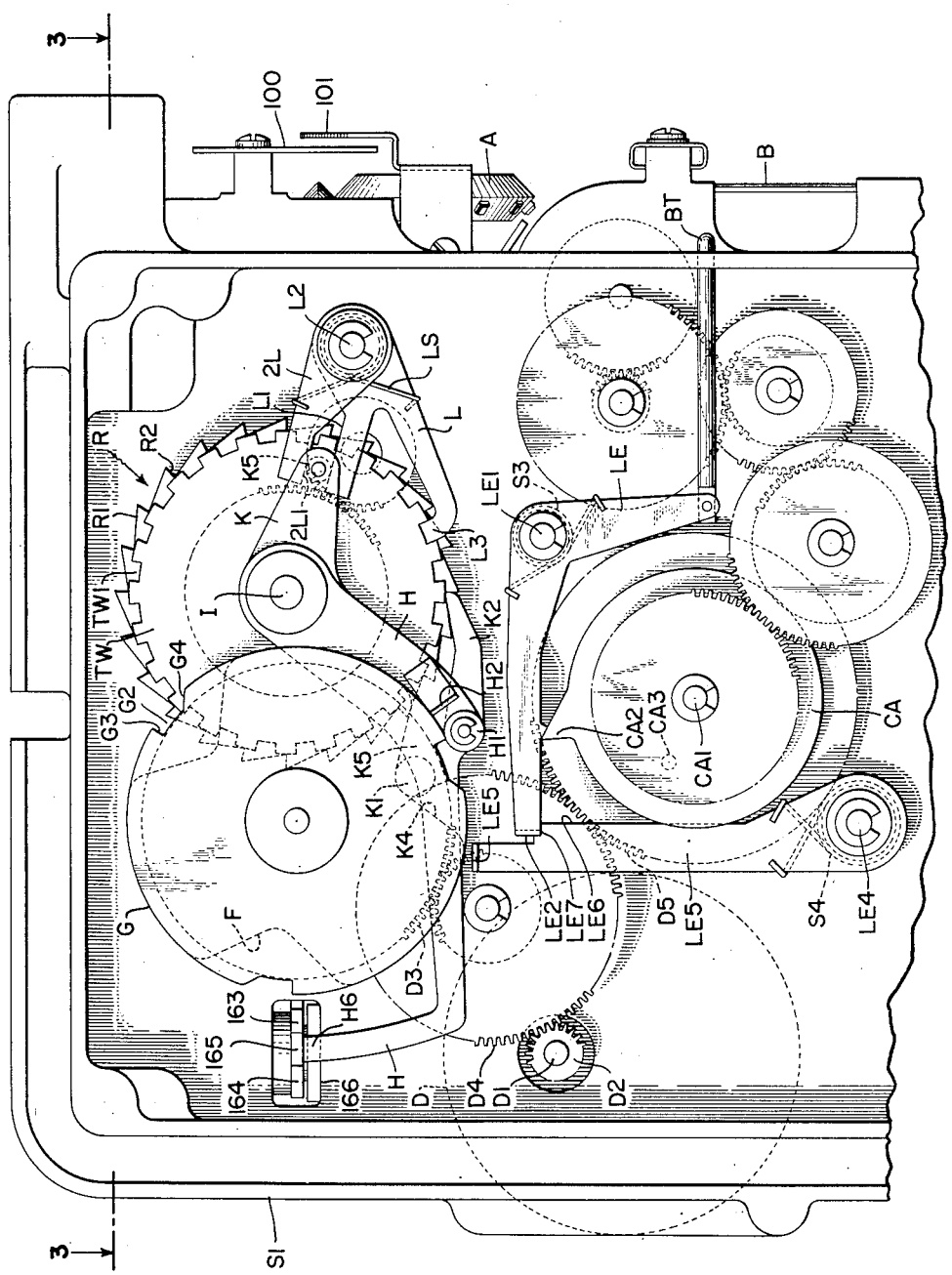
Fig. 2 is a vertical end view of the continuously operating motor and some of the mechanism driven thereby.
Figure 3:
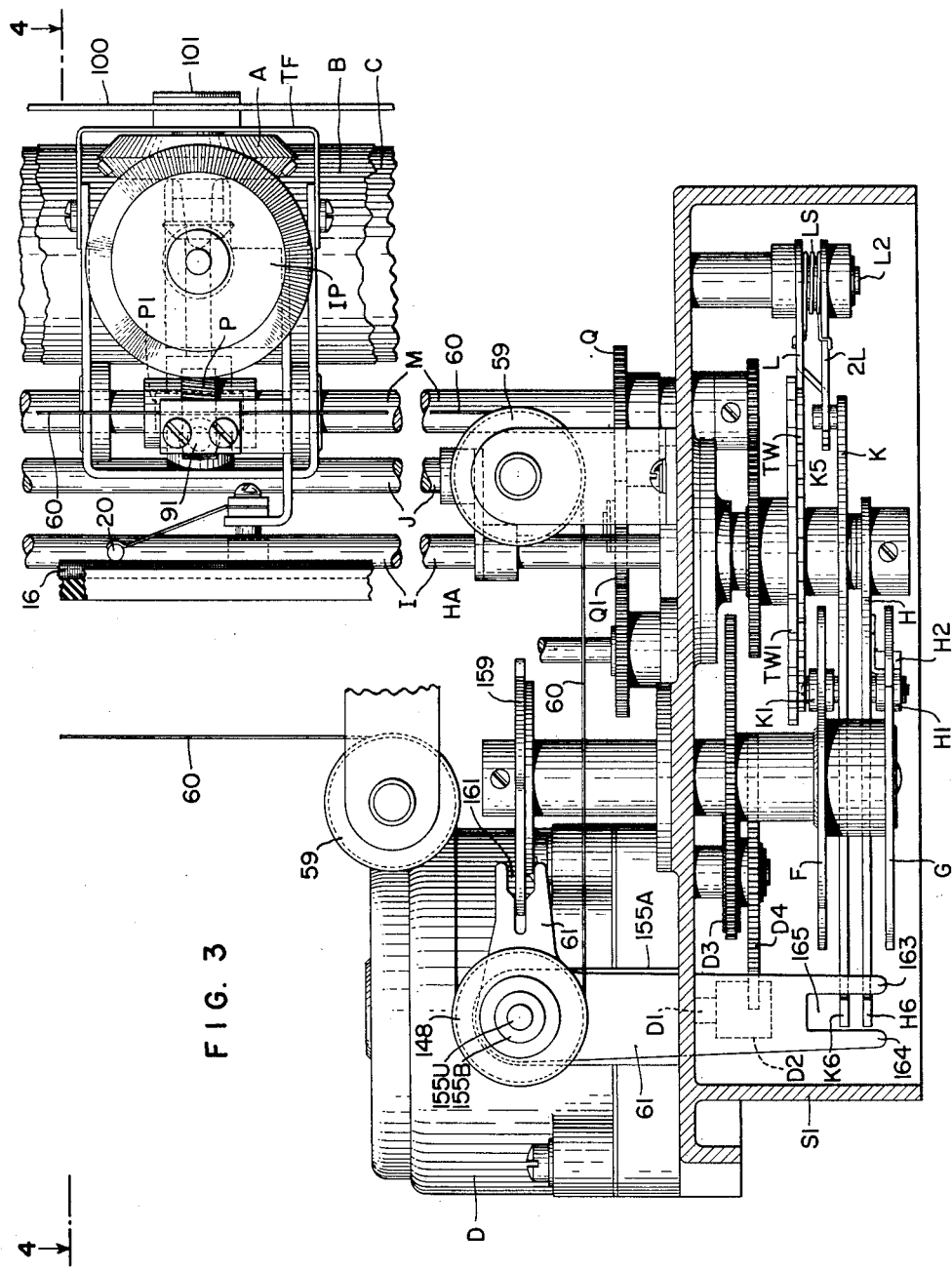
Figure 4:
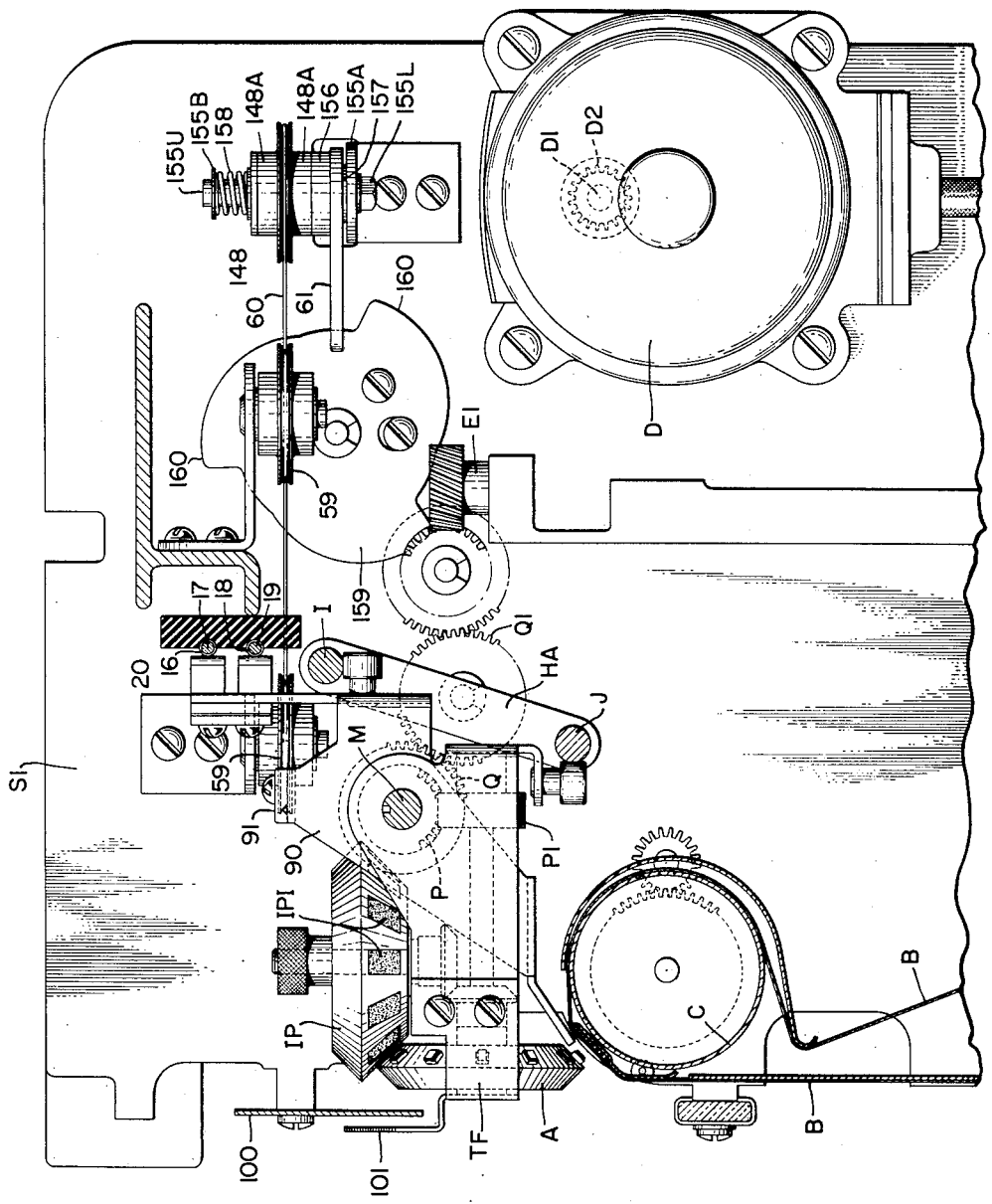

Fig. 3 is a top or plan view looking in the direction of the arrows and with parts cut away in horizontal cross section along the line 3—3 of Fig. 2 showing the detector member; and Fig. 4 is a vertical view looking in the opposite direction to Fig. 2 with parts in cross section. This view shows the gearing which causes the printing operation and which drives the printing wheel and the ink pad wheel. This view also shows the standardizing mechanism.

U. S. Patent 2,423,480 to John A. Caldwell has in it a complete disclosure of the potentiometer mechanism as a whole. Reference is made to that patent for a description of various details of the instrument which are not pertinent to the subject matter of the present case.

As is well known, potentiometer mechanisms are used to measure accurately various conditions, such as temperature. For this purpose thermocouples are subjected to the temperature to be measured and the E. M. F. produced by these thermocouples is impressed in sequence upon the potentiometer network of the instrument. A print wheel carriage is then moved to a position above a recording chart corresponding to the temperature to which the thermocouple then connected with the instrument is subjected. A record is then made of this temperature and a different thermocouple is connected to the instrument and the print wheel carriage is moved to a position corresponding to this temperature.

The mechanism by which this is done is described in detail in U. S. Patent 2,423,480. For purposes of this disclosure it is necessary to refer only briefly to various parts of the mechanism shown in Fig. 1 to describe how this operation is performed.

The thermocouple T which is responsive to the temperature that is to be measured, operates in conjunction with a potentiometer network which is generally designated at 1 to form a self-balancing potentiometer system. Upon a change in temperature to which the thermocouple is subjected, an unbalanced D. C. current in one direction or the opposite is produced depending upon the direction of unbalance of the potentiometer system. This D. C. current is supplied to an amplifier unit 2 having a vibrator or equivalent device designated at 3.

The direct current supplied to the amplifier is converted by the vibrator to a pulsating current of one phase or of an opposite phase depending upon the sense of unbalance of the potentiometer system. This pulsating current is detected by a transformer and is amplified by a vacuum tube system not shown in detail. The current from the amplifier is used for operating a reversible motor generally designated at 10 in one direction or the opposite direction. This motor serves to operate a slide-wire assembly to rebalance the potentiometer system and also serves to move an indicating and recording mechanism which will be described in detail below.

The potentiometer network may comprise three resistances, 6, 7, and 8 which are connected in series. These resistances are usually formed of some wire having substantially no temperature resistance coefficient and may be used for calibration purposes. Connected in parallel to these resistances are a battery 9, which my be in the form of a dry cell, and a dual vernier rheostat, comprising resistances 10 and 11, and electrically connected sliding contacts 12 and 13, which engage with the resistances 10 and 11, respectively. The rheostat may be operated by any suitable type of knob, there being a direct mechanical connection between the knob and the contact 12 and a lost motion connection between the knob and the contact 13. Upon initial movement of the knob, the contact 12 is first moved and then the contact 13 is moved thereby providing a vernier adustment. The battery 9 and the rheostat are connected in series with respect to each other and in parallel with the resistances 6, 7, and 8. Also connected in parallel with the first mentioned resistances are two other resistances 14 and 15, which are in turn connected in series with each other. The resistance 14 is preferably made of copper or other material having a suitable temperature resistance coefficient and the resistance 15 may be made of manganin having substantially no temperature coefficient of resistance. The resistance 14 operates to compensate for temperature changes at the cold junction of the thermocouple and is so connected into the network that the voltage drop across it is added to the thermocouple E. M. F. The resistance 15 is utilized primarily for standardization purposes and has a resistance value such that the voltage drop across it is equal to the voltage produced by the standard cell.

The slidewire assembly consists preferably of a coil 16 which is wound around and insulated from a core 17. Cooperating with the slidewire is a collector bar 18 which is also wrapped around a core 19. The slidewire and the collector bar are electrically connected by a sliding contact 20 that is driven by the motor 10 to rebalance the potentiometer circuit. The terminals of the slidewire 16 and its core 17 are connected in parallel around the resistance 7.

A two position switch 21 is connected into the potentiometer network and serves the purpose of performing two functions; namely, conecting the potentiometer circuit for normal operation (run) and standardizing the potentiometer system (standardizing). Schematically, this switch may comprise a plurality of switch arms of which arms 22 and 23 are moved together by means of a knob 24. Switch arm 22 carries on it a contact 25 and the switch 23 carries on it a contact 26, which contacts are adapted to engage respectively contacts 37 and 28 that are carried by other arms in the switch assembly. The contact 28 is connected with one lead from one of the thermocouples T. Proceeding from switch E, on the left, this lead is shown as including a wire 29 which terminates in a cold junction 30 that is located closely adjacent to resistance 14. Connected to the junction 30 is a resistance 31 which has a condenser 32 in parallel with it and a wire 33 that leads to the switch contact 28. The other thermocouple lead runs directly through wire 34 to a second cold junction 35, which is also located adjacent resistor 14, and from there through a wire 36 to the collector core 19.

The switch 21 is shown in the run position. When the switch is in its standardizing position, the contact 25 engages a contact 37 and the contact 26 engages a contact 38.

Shown in a schematic manner is vibrator 3 which comprises a vibrating reed 43 that normally engages contacts 44 and 45 but which during its vibration will separate first from contact 44 and then from contact 45. The reed is vibrated under the influence of a winding 46 that is connected to a suitable source of alternating current. Vibrating reed 43 is connected by means of wires 48 and 49 with the potentiometer circuit between resistances 14 and 15. The effect is that a circuit is completed through the thermocouple and the vibrator to the potentiometer circuit.

From time to time it becomes necessary to standardize the potentiometer and readjust the contacts 12 and 13 to compensate for the decrease of the voltage of battery 9. To this end a standard cell 52 is connected into the potentiometer circuit by means of a wire 53 that connects this cell with contact 37. When the switch 24 is in its lower or standardizing position, the standard cell is connected through vibrator by means of the wires 40, 48, and 49 so that it is placed in parallel around resistance 15. The same movement of the switch 24 brings contacts 26 and 38 into engagement to connect conductors 40 and 54. This places a resistance 55 in shunt around the vibrator.

In the operation of the potentiometer system the battery 9 places a potential drop across the slidewire 16 a portion of which, depending upon the position of contact 20, is opposed by the thermocouple voltage. When the potentiometer is in balance no current is flowing through the thermocouple circuit, but if the temperature, which is being measured by the thermocouple then connected in circuit, changes, the thermocouple voltage will change. Current will flow in one direction or the other through the potentiometer circuit to set up an alternating potential in the secondary winding 42 which is in phase or 180° out of phase with the alternating supply voltage. This alternating potential is amplified and used to control the operation of the motor 10 in the proper direction to move contact 20 to rebalance the potentiometer circuit. If, for example, the temperature should increase, the thermocouple T then in circuit would produce an increased E. M. F. and cause a current flow through the potentiometer circuit. This current flow will go through wire 29, cold junction 30, resistance 31, wire 33, contacts 28, 26, 23, and wire 40 to input 39 to amplifier 2. From here the current will flow through motor 10 in the proper direction to rebalance the potentiometer circuit. If the temperature had decreased, current would flow in the opposite direction or through wires 49 and 48 to the vibrator 3 and through wire 40 creating an alternating potential of the opposite phase with respect to the supply which is amplified to control the operation of the motor 10 in the opposite direction. The motor 10 is a rotating field motor that has a squirrel cage rotor with interconnecting bars. Two of the opposite fields of the motor, the power windings 23, are connected across the supply lines L1 and L2 with a condenser 56 in one of the leads. The other opposite fields of the motor, the control windings, are connected to the output of the amplifier 2, and have a condenser 57 in parallel with them. Each pair of the motor fields is connected in series. When the voltage and current through the motor control windings lag the voltage and current in the power windings, the motor will rotate in one direction. When the voltage and current in the control windings lead those in the power windings, the motor will rotate in the opposite direction. The amplifier shifts the phase of the current of the motor control windings so that the motor will rotate in the proper direction. As the motor 10 rotates it drives a shaft 58 integral therewith that engages a pulley 59 around which is wrapped an endless cable 60 connected to contact 20 so that, as the motor rotates, the contact will be moved in one direction or the other to rebalance the potentiometer circuit.

Amplifier 2 and one winding 23 of the motor 10 are energized by alternating current supply conductors L1 and L2, which also supply current to the energizing winding 46 of the interrupter 3. In the balanced condition of the system, the rebalancing motor 10 is at rest.

Motor D turns in one direction and revolves continuously during each period in which it is energized. In each of its operations, the motor D moves the printing element A into and out of engagement with the record chart B, and thereafter operates the selector switch E to disconnect from the measuring circuit the thermocouple T, previously connected thereto, and to connect another thermocouple T to said circuit. If the thermocouple so connected into the circuit happens to have the same voltage as the thermocouple disconnected from the circuit, the motor 10 may remain deenergized and the energization of the motor D will continue and thus promptly repeat the printing and selector switch operations. In general, however, the voltage of a thermocouple freshly connected to the measuring circuit will differ from that of the thermocouple previously connected to the circuit. In consequence, each operation of the selector switch E customarily unbalances the measuring circuit and re-energizes the motor 10. The motor D continues to rotate even after the motor 10 has rebalanced the measuring circuit.

The motor D gives rotative indexing movements to the printing wheel A and to the selector switch E and also tilts the printing wheel A into and out of engagement with the chart B.

Referring to Figs. 2 and 4, it is seen that motor D has a shaft D1 which projects through the side wall S1 of the support on which the motor D is mounted. On the end of shaft D1, shown in Fig. 2, is mounted pinion D2 which forms the input to a train of gears each marked D3. The output of the train of gears D3 is disc or print cam G. Disc or print cam G causes tilting movement of printing wheel A into and out of engagement with the chart B.

The peripheral edge of the disc or print cam G extends circularly about the axis of the disc, except where the latter is formed with one or more notches G2, three being shown in Fig. 2. When the roller H1 is in engagement with the circular portion of the disc edge, a transverse front end portion H2 of the print lever H is separated from said edge portion by a small clearance space. When the disc movement first brings the roller H1 into register with the notch, as shown in Fig. 2, the print lever H turns only far enough to bring the lever end portion H2 into engagement with the circular edge portion of the disc. A further small turning movement of the print cam or disc G permits the lever end H2 and roller H1 to turn into engagement with the bottom wall of the notch G2. The forward end wall G3 of the notch G2, then adjacent to the end portion H2, is substantially radial, so that the turning movement of print lever H is not substantially retarded until it engages the bottom wall of the notch.

The relatively rapid movement of the printing wheel A into printing engagement with the chart B is followed by a more gradual return movement of the printing wheel A as the roller H1 rides up on the inclined rear wall G4 of the notch G2. As best seen in Fig. 2, the print lever H turns about its pivot I and moves the printing wheel A into and out of engagement with the chart B through a device J (Fig. 4) attached to the rear end of the print lever H, and having a stirrup parallel to the chart roll C. Stirrup J extends through, and is journalled in, the instrument side frames S1 and S2. The print lever H is located at the righthand side of the instrument as seen in Fig. 2, and the stirrup J is pivotally connected to the shaft I at the opposite side of the instrument through an arm HA, which may be a duplicate of the portion of the print lever H connecting the bar J to the shaft I.

Figure 1:
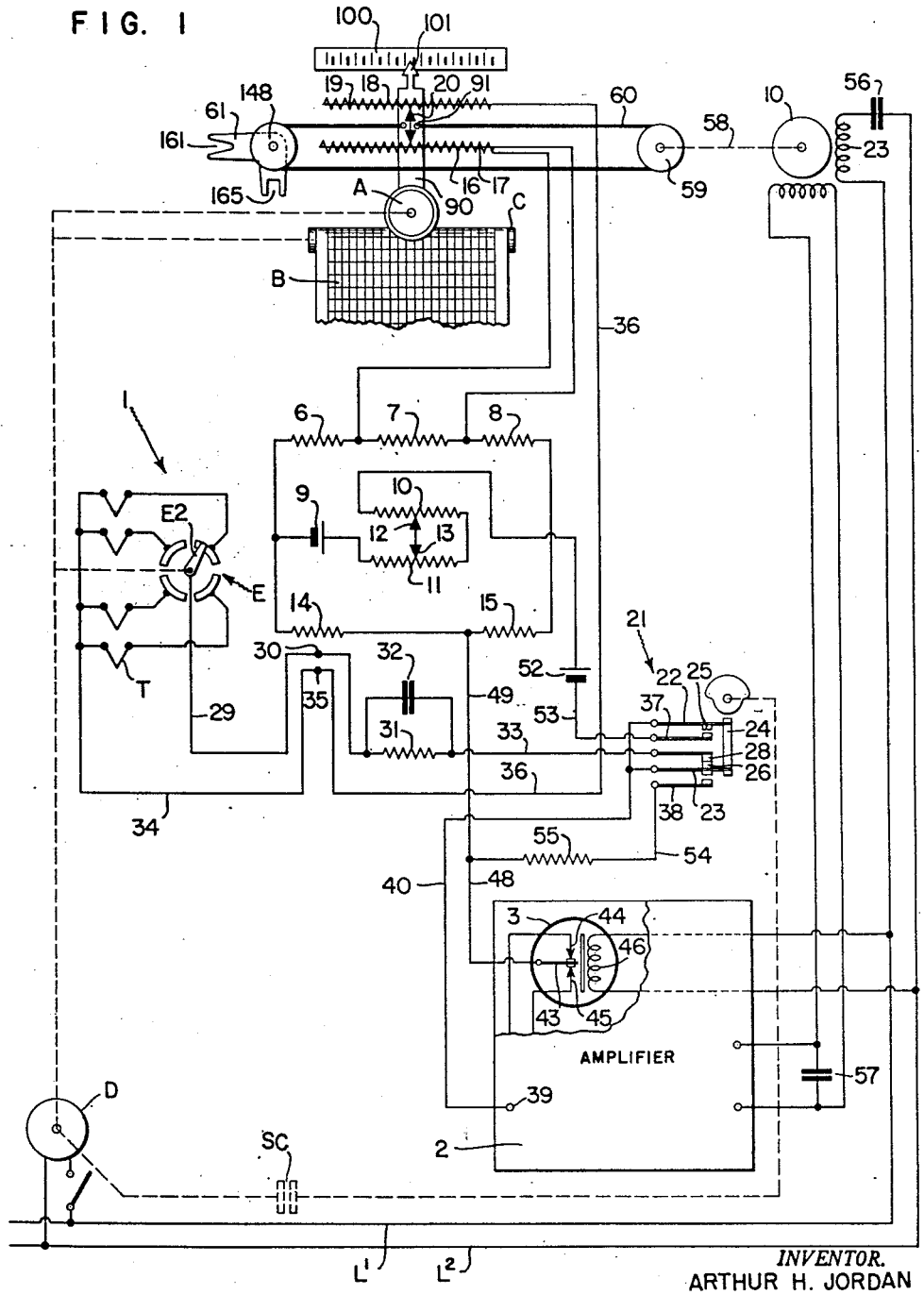
Fig. 1 is a diagram of a strip chart potentiometer and the electric circuits and mechanical gear trains associated therewith.

Rotation of print wheel cam F (Fig. 2) causes indexing movement of printing wheel A (Fig. 4) and ink pad wheel IP and also of selector switch E (Fig. 1). Motor D continuously drives print wheel cam F through shaft D1, pinion D2 and gear train D3. Print wheel lever K is pivoted about the same axis as is shaft I. Lever K carries a roller K1 pivotally mounted on it. Roller K1 rolls along the rim of cam F and is actuated thereby. Referring to Fig. 2, rotation of print wheel lever K and roller K1 clockwise about pivot I disengages pawl K2 from the radial face R2 of one of the teeth R1 of ratchet R. The subsequent, counter-clockwise movement of print wheel lever K, in consequence of the engagement of roller K1 with the inclined rear wall K4 of the notch K5, causes pawl K2 to engage the radial face R2 of the next tooth R1 and to thereby turn the ratchet R a fraction (in the example shown, one twenty-fourth) of a complete turn.

Print wheel lever K carries, at its right hand end, a pin K5 which engages with face L1 of latch L, which pivots about pin L2. Latch L has another face L3 which fits into one of the notches TW1 of toothed wheel TW. Wheel TW is fast to ratchet R and normally holds ratchet R and the parts connected to it against movement. Pin K5 also bears against face 2L1 of latch 2L. Latches L and 2L are both biased toward pin H5 and toward each other by a spring LS.

The tilting frame TF (Fig. 4) which supports the printing wheel A and associated parts is pivotally supported by the shaft M through a sleeve which surrounds and is splined on the shaft I so that the sleeve turns with the shaft when the latter is given its angular indexing adjustments hereinafter described. The sleeve is journalled in the carriage 90 and shares the movement of the latter longitudinally of the shafts J and I. The printing wheel A is provided with printing element projections distributed about its periphery and bearing different letters, numbers or other identifying symbols, at their outer ends. Angular indexing adjustments of the shaft M bring different printing elements into printing position.

As is shown in Fig. 4, the angular adjustment of the shaft M gives a corresponding angular adjustment to the printing wheel A through a gear connection comprising a spur gear P coaxial with and secured to the sleeve, which is splined on the shaft M, and a gear P1 coaxial with and secured to the printing wheel A which is pivotally connected to the supporting member TF. The latter also supports an inking wheel IP and gears P3 and P4 through which the rotation of the shaft M gives appropriate rotative movements to the wheel IP. The gear P3 is an intermediate gear in mesh with the gear M and with the gear P4, the latter being coaxial with and rigidly secured to the inking wheel IP.

The inking wheel IP carries a circular series of inking pads IP1, one for each of the different printing elements. The inking pads IP1 may or may not supply inks of different colors to the respectively corresponding printing elements. The number of printing elements on the wheel A should be suitably related to the number of different thermocouples which are to be successively measured. In some cases, there may be as many printing elements as thermocouples T, and in other cases, there may be two or more times as many printing elements as there are thermocouples T to be measured. As shown, there are four thermocouples T and twelve elements, and the record of the value of each thermocouple is made in part by one, and in part by the other of three different printing elements.

As shown in Fig. 4, motor D gives shaft M angular indexing adjustments which adjust the selector switch E. This is done by means of gear Q which forms the input gear of a train of gears, each marked Q1. The output gear of this train turns shaft E1 on which the movable contact E2 (Fig. 1) of switch E is mounted.

Referring to Fig. 1, it will be seen that balancing motor 10 moves the carriage 90, on which the print wheel A is pivoted, to and fro across the width of the chart B to a position which corresponds to the value of the temperature, which is being measured, at that instant, by that thermocouple T, which is connected to the balancing motor 10. The value of this temperature is also indicated on scale 100 by pointer 101 also carried by carriage 90.

Motor 10 is mechanically connected to a pulley 59 around which is trained a cable 60 fastened to carriage 90 at 91.

In Fig. 1, the mechanical connections, by means of which motor D drives the selector switch E, the chart roll C, and the print wheel A, are indicated by dotted lines.

All the mechanism described so far operates to print, in a fixed time cycle, the temperature sensed by each thermocouple T in succession. By means of the mechanism about to be described this cycle can be speeded up by causing the printing mechanism to operate as the potentiometer circuit 1 balances.

Figs. 3 and 4 show that a detecting plate 61 is moved by the cable 60 to give an indication when the cable has stopped moving and the printing carriage is properly positioned. This is done by frictionally mounting the plate 61 on the bushing 148A. To this end, the plate 61 is frictionally received between a flange 156, formed as part of the bushing 148A, and a washer 157 which is rotatable with the bushing but may move axially thereof. Extending through the bushing is a bolt 155, which has between its lower head 155L and the washer 157, a second washer 155A. The latter washer is drawn into engagement with the former by a spring 158 that is compressed between the upper end of bushing 148A and a nut 155B. The amount of friction between the plate 61 and the parts 156 and 157 may be adjusted by varying the tension of the spring 158. A second nut 155U is placed on the upper end of bolt 155 beyond nut 155B to lock the latter in place.

As the plate 61 is rotated along with the pulley 148, when the instrument is in its unbalanced condition, the plate 61 is periodically brought back to a neutral position by a cam 159, which is driven at a constant speed by the motor D by a drive mechanism, which is not shown. The cam 159 is a three lobe cam and it has three high points 160 which periodically pass through a V-shaped groove 161 that is formed in the plate 61.

In the operation of the instrument, the cam 159 is rotated at a constant speed. Assuming that the instrument is in an unbalanced position and that the print wheel carriage is being moved in one direction or the other, this means that the plate 61 will be rotated so that the edges of the slot 161 will bear against one side or the other of the cam 159. This plate is periodically brought into a neutral position as a point 160 of the cam passes through the apex of the slot 161. If the instrument is still unbalanced, the plate 61 will have been moved either clockwise or counterclockwise in Fig. 3. Figs. 2 and 3 show that the ends 163 and 164 of detecting plate 61 project through an opening 166 in support S1. Thus either end 163 or end 164 or the slot 165 (between these ends) may be in the path of end H6 of lever H. If either end 163 or 164 is in the path of end H6, lever H is prevented from rotating clockwise and, consequently, from tilting plate TF about its pivot on carriage 90. This prevents print wheel A from engaging chart B to print a character thereon. However, if slot 165 is aligned with the end H6 of lever H, the latter is free to rotate clockwise, as seen in Fig. 2, and the printing operation proceeds.

Fig. 2 also discloses means whereby the printing mechanism is held against operation while the potentiometer is being standardized or recalibrated by connecting the standard cell 52 into circuit by means of the standardizing switch 21. This means comprises a constantly rotating gear train driven from motor D by means of shaft D1, pinion D2, and gear train D3. Gear D4 meshes with one of the gears D3 so that gear D4 drives gear D5 to which is fastened shaft CA1 on which cam CA is mounted. Cam CA rotates constantly. This causes lug CA2 to rotate lever LE clockwise intermittently about its pivot LE1 and against the bias of spring S3. Movement of LE lifts its end LE2 out of the path of a second lever LE3, which turns clockwise about its pivot LE4 under the bias of spring S4 so that end LE5 locks lever H against clockwise movement and, consequently, prevents the printing operation from taking place. At the same time, standardizing clutch SC (Fig. 1) is closed. This permits motor D to move standardizing switch 21 from its upper or normal position into its lower or standardizing position.

Cam CA carries with it pin CA3. During a part of each rotation of cam CA, pin CA3 engages face LE6 of lever LE3 and causes lever LE3 to rotate counterclockwise. This removes face LE7 of lever LE3 from beneath face LE2 of lever LE and allows lever LE to drop into contact with the rim of cam CA again. When lever LE is not lifted by lug CA2, face LE2 engages face LE7 and locks lever LE3 against clockwise movement.

Button BT can be pressed by hand to rock lever LE clockwise and thus close standardizing switch SC (Fig. 1) and thereby cause the standardizing operation to take place manually.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In a multiple recording instrument, a constantly rotating motor, a print cam constantly rotated by said motor, a print wheel cam constantly rotated by said motor, said cams being synchronized, a print wheel carriage, a member mounted for pivotal movement on said carriage, means to move said print wheel carriage to and fro across the chart of said instrument, a print wheel having a plurality of characters thereon and rotatably mounted on said member, an ink pad wheel rotatable on said member whereby different characters on said print wheel are brought into engagement with different portions of said ink pad wheel, a print lever engaging said print cam and driven thereby and engaging said member so as to cause printing operation of said print wheel, a print wheel lever engaging said print wheel cam and driven thereby, a ratchet mounted so as to be rotated by said print wheel lever, a pawl biased to engage said ratchet, a latch biased to engage said ratchet and to hold said ratchet stationary, cooperating means between said pawl and said latch and acting to keep said pawl in engagement with said ratchet in each direction of movement of said print wheel, whereby upon movement of said print wheel in one direction said pawl will be moved relative to said ratchet while said ratchet is held stationary by said latch and whereby upon movement of said print wheel in the opposite direction said ratchet will be rotated by said pawl, and means to rotate said print wheel as said ratchet rotates.

2. In a multiple recording instrument, a print wheel carriage, means to move said print wheel carriage to and fro across the chart of said instrument, a constantly rotating motor, a print cam constantly rotated by said motor, a print wheel cam constantly rotated by said motor, said cams being synchronized, a member mounted for pivotal movement on said carriage, a print wheel having a plurality of characters thereon and mounted on said member, an ink pad wheel rotatably mounted on said member whereby different characters on said print wheel are brought into engagement with different portions of said ink pad wheel, a print lever, a roller pivotally mounted on said print lever and engaging the rim of said print cam whereby said print cam rocks said print lever, mechanism between said print lever and said member whereby said print lever rocks said member and causes said print lever to engage the chart of said instrument, a print wheel lever engaging said print wheel cam and driven thereby, a ratchet mounted so as to be rotated by said print wheel lever, a pawl biased to engage said ratchet, a latch biased to engage said ratchet and to hold said ratchet stationary, cooperating means between said pawl and said latch and acting to keep said pawl in engagement with said ratchet in each direction of movement of said print wheel, whereby upon movement of said print wheel lever in one direction said pawl will be moved relative to said ratchet while said ratchet is held stationary by said latch and whereby upon movement of said print wheel lever in the opposite direction said ratchet will be rotated by said pawl, and means to rotate said print wheel as said ratchet rotates.

3. In a multiple recording instrument, a print wheel carriage, means to move said print wheel carriage to and fro across the chart of said instrument, a constantly rotating motor, a print cam constantly rotated by said motor, a print wheel cam constantly rotated by said motor, said cams being synchronized, a member mounted for pivotal movement on said carriage, a print wheel having a plurality of characters thereon and rotatably mounted on said member, an ink wheel pad rotatably mounted on said member whereby different characters on said print wheel are brought into engagement with different portions of said ink wheel pad, a print lever engaging said print cam and driven thereby and engaging said member so as to cause printing operation of said print wheel, a print wheel lever, a roller pivoted on said print wheel lever and engaging the rim of said print wheel cam and driven thereby to cause said print wheel lever to move about its pivot, a ratchet mounted so as to be rotated by said print wheel lever upon pivotal movement of said lever, a pawl pivotally mounted on said print wheel lever and biased to engage said ratchet, a latch biased to engage said ratchet and to hold said ratchet stationary, cooperating means between said pawl and said latch and acting to keep said pawl in engagement with said ratchet in each direction of movement of said print wheel lever, whereby upon movement of said print wheel lever in one direction said pawl will be moved relative to said ratchet while said ratchet is held stationary by said latch and whereby upon movement of said print wheel lever in the opposite direction said ratchet will be rotated by said pawl, and means to rotate said print wheel as said ratchet rotates.

4. In a multiple recording instrument according to claim 1, means to rotate said ink pad wheel as said ratchet rotates.

5. In a multiple recording instrument according to claim 1, means for connecting one of a plurality of thermocouples to said instrument, and means to actuate said switch as said ratchet rotates.

6. In a multiple recording instrument according to claim 1, a switch for connecting one of a plurality of thermocouples to said instrument, means to actuate said switch as said ratchet rotates, a standard cell, a standardizing switch adapted to be switched into standardizing position so as to disconnect said thermocouples from said instrument and to connect said standard cell to said instrument and to be switched out of standardizing position, and means to actuate said standardizing switch into standardizing position as said ratchet rotates.

7. In a multiple recording instrument, a print wheel carriage, means to move said print wheel carriage to and fro across the chart of said instrument, a constantly rotating motor, a print cam constantly rotated by said motor, a print wheel cam constantly rotated by said motor, said cams being synchronized, a member mounted for pivotal movement on said carriage, a print wheel having a plurality of characters thereon and rotatably mounted on said member, an ink pad wheel rotatably mounted on said member whereby different characters on said print wheel are brought into engagement with different portions of said ink pad wheel, a print wheel lever engaging said print cam and driven thereby and engaging said member so as to cause printing operation of said print wheel, a print wheel lever engaging said print wheel cam and driven thereby, a ratchet mounted so as to be rotated, a first pawl biased to engage said ratchet and mounted on said print wheel lever, a toothed wheel connected to said ratchet and rotatable therewith, a toothed lever having a toothed end for engagement between the teeth of said toothed wheel to prevent rotation of said toothed wheel and of said ratchet, said print wheel lever engaging said toothed lever whereby movement of said print wheel lever in one direction moves said pawl relative to said ratchet and lifts the toothed end of said toothed lever from said toothed wheel and whereby movement of said print wheel lever in the opposite direction causes said first pawl to rotate said ratchet, said toothed wheel having a portion engaging the toothed end of said toothed lever and holding said toothed end out of the teeth of said toothed wheel until said print wheel lever and said first pawl having finished their movement and then allowing said toothed end of said toothed lever to engage with a tooth of said toothed wheel and to lock said toothed wheel and said ratchet against further movement, and means to rotate said print wheel as ratchet rotates.

8. In a multiple recording instrument, a print wheel carriage, means to move said print wheel carriage to and fro across the chart of said instrument, a member mounted for pivotal movement on said carriage, a print wheel having a plurality of characters thereon and rotatably mounted on said member, a constantly rotating motor, a print cam constantly rotated by said motor, a print lever engaging said print cam and driven thereby and engaging said member so as to cause printing engagement of said print wheel, a constantly rotating cam driven by said motor, a first lever biased toward said cam and movable by said cam, a second lever normally locked against movement in one direction by said first lever and free for movement in said direction when said first lever is moved by said cam, means biasing said second lever into engagement with said print lever when said second lever is disengaged by said first lever, said second lever locking said print lever against printing operation when said second lever is disengaged, and means on said cam causing said second lever to move to its original position and to be locked therein by said first lever.

References Cited in the file of this patent

UNITED STATES PATENTS 2,328,664    Moore _____ Sept. 7, 1943